United States Patent
Bossaerts et al.

(10) Patent No.: US 7,073,586 B2
(45) Date of Patent: Jul. 11, 2006

(54) SYSTEM FOR TREATING AN UNDERGROUND FORMATION

(75) Inventors: Jan Dirk Bossaerts, Overijse (BE); Marc Jozef Rans, Haasrode (BE)

(73) Assignee: Hexion Specialty Chemicals, Inc., Columbus, OH (US)

( * ) Notice: Subject to any disclaimer, the term of this patent is extended or adjusted under 35 U.S.C. 154(b) by 14 days.

(21) Appl. No.: 10/507,301

(22) PCT Filed: Apr. 29, 2003

(86) PCT No.: PCT/EP03/04458

§ 371 (c)(1),
(2), (4) Date: Sep. 8, 2004

(87) PCT Pub. No.: WO03/097994

PCT Pub. Date: Nov. 27, 2003

(65) Prior Publication Data

US 2005/0092492 A1  May 5, 2005

(30) Foreign Application Priority Data

May 17, 2002  (EP) .................................. 02076950

(51) Int. Cl.
*E21B 33/138*  (2006.01)

(52) U.S. Cl. .................... 166/295; 166/300; 166/305.1

(58) Field of Classification Search .................... None
See application file for complete search history.

(56) References Cited

U.S. PATENT DOCUMENTS 4,541,489 A * 9/1985 Wu ............................. 166/312
5,368,102 A * 11/1994 Dewprashad et al. ....... 166/276
6,085,842 A * 7/2000 Bossaerts et al. ........... 166/295

FOREIGN PATENT DOCUMENTS

| EP | 0 826 865 A | 3/1998 |
| EP | 0 864 726 | 9/1998 |
| GB | 1 047 409 A | 11/1966 |
| WO | WO 97 20129 | 6/1997 |

* cited by examiner

*Primary Examiner*—Zakiya W. Bates

(57) ABSTRACT

A method of treating an underground formation of an oil reservoir, comprising the sequential steps of (a) contacting the formation with an aqueous medium, (b) contacting the underground formation with a hydrocarbon fluid, (c) contacting the underground formation with a solvent in the form of a glycol ether, (d) contacting the underground formation with a first consolidation constituent solution, mainly comprising a poly epoxy resin, (e) contacting the underground formation with second consolidation constituent substantially homogenous solution mainly comprising a curing agent in a solvent.

4 Claims, No Drawings

SYSTEM FOR TREATING AN UNDERGROUND FORMATION

The present invention relates to a method of treating an underground formation. More in particular, the present invention relates to a method of treating an underground formation in oil and gas reservoirs, by using a consolidation solution of an epoxy resin and a curing agent. Such a method was known from e.g. EP 0864032 B1, which actually disclosed a method of treating an underground formation comprising the sequential steps of
(a) contacting the formation with an aqueous medium;
(b) contacting the formation with a hydrocarbon fluid;
(c) contacting the formation with a solvent in the form of a glycol ether;
(d) contacting the formation with a consolidation solution comprising a monomeric diglycidyl ether of bisphenol A, such as EPIKOTE 828, in a proportion of from 30 to 60% m and methylene dianiline as curing agent in a proportion of from 5 to 20% m in the solvent and
(e) contacting the formation with a viscosified hydrocarbon fluid (the so called over-flush) to displace a majority of the resin phase and to restore the permeability of the treated underground.

As suitable glycol ethers for the solvent were exemplified methoxy propanol, butoxyethanol, hexoxy ethanol and isomers of these glycol ethers, which may be optionally mixed with a minor amount (e.g. less than 10% m) of a polyethylene glycol, having an average molecular mass of around 400, to adjust the viscosity.

It is true that on the other hand was known from 'Journal of Petroleum Technology', December 1966, B. R. Treadway, H. Brandt and P. Harold Parker, page 1537–1543, a three step sand consolidation process. Said process consisted of
(1) injecting epoxy resin
(2) following the displacement of the resin by diesel oil to establish formation permeability, and
(3) activating the resin to consolidate the formation by injecting an activator flush to cure the epoxy resin.

The applied epoxy resin system consisted of pure epoxy resin or an epoxy resin acid anhydride system.

Moreover it was known from '52$^{nd}$ Annual Fall Technical Conference and Exhibition of the Society of Petroleum Engineers of AIME', Denver, Colo., Oct. 9–12, 1977, W. L. Penberthy, C. M. Shaugnessy, C. Gruesbeck and W. M. Salathiel (Exxon Production Research Co.), that for effective sand consolidation, the epoxy resin must wet the surface of the sand grains and that in those cases where the resins lack this ability a pre-flush which preferentially removes water in the presence of oil is essential and particularly when there had been a prior mud acid treatment. Radial field-scale model studies had demonstrated that pre-flush effectiveness was dependent on pre-flush volume, viscosity and sand permeability.

Due to the increased economic requirements for present exploitation of oil reservoirs, in incompetent, high temperature, high pressure formations said underground treating has to be further improved. By the term incompetent one will understand: formations of insufficient mechanical strength to allow sand-free production.

It will be appreciated that a clear disadvantage of the prior art underground treating methods was that the actual curing of the supplied epoxy resin and curing agent did not take place at the desired places due to high temperatures in the underground to be treated and/or the insufficient solubility or dispersability of the applied curing agents in the glycol ether solvent system or due to an unsuitable viscosity of the consolidation solution which caused that the required stoichiometric mutual ratio between epoxy resin molecules and curing agent molecules, could not be reached on the spot or in the specific area to be treated.

It will be appreciated that more in particular, consolidated formations should have the strength to withstand stresses induced by adjacent rock strata and stresses imposed by the flow of fluids into the wellbore. This consolidation strength should be maintained under production conditions, moreover the consolidated formation should have sufficient permeability to permit unobstructed flow of fluids into the wellbore and must show sufficient resistance to the conditions of well stimulation dilute solutions of acids, such as hydrochloric acid, hydrofluoric acid and acetic acid.

An object of the present invention is therefore to provide an improved method of treating hydrocarbon reservoirs in order to eliminate the entrainment of sand minerals and as a consequence wear of production equipment.

As result of extensive research and experimentation, such improved treating method has been surprisingly found.

Accordingly, the invention relates to a method of treating an underground formation of an oil reservoir in incompetent, high temperature, high pressure formations, comprising the sequential steps of
a) contacting the formation with an aqueous medium,
b) contacting the underground formation with a hydrocarbon fluid,
c) contacting the underground formation with a solvent in the form of a glycol ether,
d) contacting the underground formation with a first consolidation constituent solution, mainly comprising a poly epoxy resin derived from bisphenols, or a poly phenolic resin (novolac resins), in a solvent mainly comprising a glycol ether, in an epoxy resin concentration of from 25 to 75% m and having a viscosity in the range of from 10 to 100 m Pa.s,
c) contacting the underground formation with a second constituent substantially homogenous consolidation solution mainly comprising a curing agent in a solvent, mainly comprising a hydrocarbon fluid. Said curing agent occurring in a concentration in the range of from 0.5 to 20% m, and the solution having a viscosity such, that the ratio between the viscosity of the solution in step (d) and of the solution in step (e) is in the range of from 1.0 to 5.

With the term 'mainly comprising' as used throughout the present specification is meant that the specified constituent (i.e. epoxy resin or solvent) is the sole component or can be mixed with minor amounts of co-components i.e. in amounts of 10% m or less and preferably in amounts of 5% m or less. For example, the preferably applied poly epoxy resin is a poly epoxy novolac resin, which optionally can be mixed with up to 10% m of a diglycidylether of diphenylolpropane (bisphenol A), or of diphenylolmethane (bisphenol F).

The applied poly epoxy resin may be derived from phenol, cresols, xylenols, carvacol, cumenol and phenols, substituted with halogen or lower alkyl, having from 1 to 4 C atoms.

More preferably a poly epoxy phenol or cresol novolac resin is used of the type which is commercially available as EPIKOTE 154 (Traded by Resolution Performance Products).

The aqueous medium used in step (a) can be naturally occurring, treated i.e. filtered or desalinated water, such as pretreated sea water or water from rivers, or a KCl or NaCl brine, containing up to 6% m of KCl or NaCl, $Na_2SO_4$, $K_2SO_4$, $NaNO_3$, $KNO_3$ and the like and preferably up to 3% m and more preferably the same brine as originally occurring in the underground involved.

The hydrocarbon fluid, used in step (b) can be in principle selected from a great variety of hydrocarbons but will be preferably selected from aliphatic hydrocarbons and more preferably gasoils.

The glycol ether solvent to be used in steps (c) and (d) can be selected from ethers of a $C_2$ to $C_6$ dihydric alkanol, containing at least one $C_1$ to $C_6$ alkyl group.

Preferably mono ethers of dihydric alkanols, more preferably glycol ethers selected from the group including methoxypropanol, butoxyethanol, hexoxyethanol and the isomers of these glycol ethers, or mixtures thereof.

To adjust the viscosity of said solvent it may further contain a minor amount e.g. less than 10% m, of a polyethylene glycol or polyvinyl pyrrolidone, having an average molecular mass of about 400.

The curing agent to be used in the solution of step (e) can be selected from a great variety of usually applied curing agents for epoxy resins with the restriction that such curing agent must be completely miscible in the applied hydrocarbon fluid in a sufficient degree in order to reach the required concentrations, that the curing agent does not produce low molecular byproducts during curing and that the finally cured epoxy resin on the spot has sufficient mechanical strength, i.e. between the individual mineral groups on almost only on contact areas and must show a minimal impediment to fluid flow at the curing conditions on the spots to be treated, i.e. high temperature (from 80 to 200° C.) and high pressure (from 10 to 100 atm).

Preferably amine type curing agents will be used selected from aliphatic di or poly amines or alkylaryl amines, more preferably diethylene toluene diamine, diethylene xylene diamine, diethylene dianiline are used, of which diethylene toluene diamine is the most preferred.

The solvent to be used in the step (e) is a hydrocarbon mixture e.g. SHELLSOL D70, SHELLSOL TD, SHELLSOL D40, SHELLSOL LF (SHELLSOL is a Shell Trade mark), EXXSOL D70 EXXSOL 155/170, EXXSOL D220/230 (EXXSOL is a Exxon Mobil Trade mark) HIDRSOL 75/95 N, HYDROSOL 100/130 N (HYDROSOL is a Total Fina Trade mark). To ensure that the viscosity of the mixture in step (e) has a viscosity in excess of that used in step (d), a viscosifier may be used, for example lubricant oil such as VALVATA 460, SHELLVIS 50 (VALVATA & SHELLVIS are Shell Trade mark), Worm Gear Oil (Amoco Oil Co), CYLESSTIC TK-460 (CYLESSTIC is a Exxon Mobil Trade mark) SENATE 460 SENAT is a Gulf Oil Co Trade mark).

It will be appreciated that a catalyst has preferably to be applied for the efficient curing of the epoxy resin/curing agent on the spot to be treated. Suitable curing catalysts can be selected from salicylic acid and phosphine, phosphonium amine and ammonium catalysts, which are generally known in the art.

Said catalyst can be added in amounts of up to 1% m relative to the weight of the total supplied solution either in step (d), i.e. premixed with the epoxy resin component, or can be added in step, i.e. premixed with the curing agent in a solvent, of which the latter embodiment is preferred.

It will be appreciated that such sand consolidation method could meet all the presently desired sand consolidation characteristics, as were specified herein before.

The invention is further illustrated by the following examples, however without restricting its scope to these embodiments.

EXAMPLES

To illustrate the effect of method of the present on the unconfined compression strength, several samples were made and subjected to treatments. For each test three samples were made of "METTET QUARTZ SAND" (96% of the grain diameters are in the range of from 63 to 180 µm and D50=130 µm) in a glass tube, each sample had a diameter of 3.5 cm and a length of 17 cm. After the sand had been placed in the tube the porosity, $\Phi$ (in %) was determined. The sand pack was flushed with butane to remove air, and thereafter the sand pack was flushed with an aliphatic hydrocarbon in which butane dissolves to remove the butane. The initial permeability, $K_i$ (in Darcy), was determined.

To simulate formation conditions, the following fluids were injected (1) methoxypropanol, (2) brine (2% m KCl); and (3) about 10 pore volumes of crude oil to establish irreducible water saturation.

The treatment according to the invention comprises contacting the samples filled with crude oil at irreducible water saturation in the following sequence: (a) contacting the sample with 2 pore volumes of a 2% m KCl brine; (b) contacting the sample with 2 pore volumes of gasoil: (c) contacting the sample with 2 pore volumes of methoxypropanol; (d) contacting the sample with 1 pore volume of a consolidation solution of Example A 1 pore volume (pv) of 28.8% m:m EPIKOTE 154 in methoxypropanol, followed by 4 pv of 3.7% m:m DETDA in a hydrocarbon solution, consisting of 31.7% m:m SHELLSOL D70 and 68.3% m:m VALVATA460.

Example B 1 pore volume (pv) of 62.0% m:m EPIKOTE 828 in methoxypropanol, followed by 4 pv of 1.96% m:m DETDA in a hydrocarbon solution, consisting of 31.7% m:m SHELLSOL D70 and 68.3% m:m VALVATA460.

Example C 1 pore volume (pv) of 38.0% m:m EPIKOTE 154 in methoxypropanol, followed by 4 pv of 7.2% m:m DETDA in a hydrocarbon solution, consisting of 33.1% m:m SHELLSOL D70 and 66.9.3% m:m VALVATA460.

Example D 1 pore volume (pv) of 38.0% m:m EPIKOTE 154 in methoxypropanol, followed by 4 pv of 21.6% m:m DETDA in a hydrocarbon solution, consisting of 36.0% m:m SHELLSOL D70 and 64.0% m:m VALVATA460.

Comparative Example 1 pore volume (pv) of 46.5% m:m EPIKOTE 828 and 13.5% MDA m:m in methoxypropanol, followed by 4 pv of a hydrocarbon solution, consisting of 31.7% m:m SHELLSOL D70 and 68.3% m:m VALVATA460

After the treatment the final permeability, $K_e$ (in Darcy), and the unconfined compression strength, UCS (in bar), were determined. The results are summarized in Table 1 below.

TABLE 1

| | Results of the treatment | | | |
|---|---|---|---|---|
| | $\Phi$, in % | $K_I$, in Darcy | $K_e$, in Darcy | UCS, in bar |
| Example A | 40 | 4.54 | 4.51 | 180 |
| Example B | 40.4 | 4.34 | 4.30 | 106 |
| Example C | 40.5 | 4.44 | 4.15 | 157 |
| Example D | 40.4 | 4.73 | 4.28 | 73 |
| Comparative | 41.2 | 4.13 | 3.96 | 156 |

From the examples made according the present invention one can appreciate that the Example treated according to the inventions has a higher permeability for an excellent to acceptable unconfined compression strength compared to the state of the art technology. Moreover it has been found that the drop of permeability for the sample treated according to the invention is lower than the one reported in the prior art.

The invention claimed is:

1. A method of treating an underground formation of an oil reservoir, comprising the sequential steps of
   a) contacting the formation with an aqueous medium,
   b) contacting the underground formation with a hydrocarbon fluid,
   c) contacting the underground formation with a solvent in the form of a glycol ether,
   d) contacting the underground formation with a first consolidation constituent solution, mainly comprising a poly epoxy resin derived from bisphenols, or a poly phenolic resin (novolac resins), in a solvent mainly comprising a glycol ether, in an epoxy resin concentration of from 25 to 75% (mass) and having a viscosity in the range of from 10 to 100 mPa.s,
   e) contacting the underground formation with second consolidation constituent substantially homogenous solution mainly comprising a curing agent in a solvent mainly comprising a hydrocarbon fluid, said curing agent occurring in a concentration in the range of from 0.5 to 20% (mass), and the solution having a viscosity such, that the ratio between the viscosity of the solution in step (d) and of the solution in step (e) is in the range of from 1.0 to 5.

2. The method of claim 1, wherein the epoxy resin solution is selected from a solid or liquid at 23° C., epoxy-novolac resin.

3. The method of claim 2, wherein the epoxy resin solution is a solid epoxy novalac resin.

4. The method of claim 1, wherein the curing agent is selected from aliphatic polyamines, alkyl-aryl polyamines and more preferably diethylene toluene diamine (DETDA).

* * * * *